United States Patent

[11] 3,621,304

[72] Inventor Grover K. Houpt
Wayne, Pa.
[21] Appl. No. 791,326
[22] Filed Jan. 15, 1969
[45] Patented Nov. 16, 1971
[73] Assignee Automatic Timing & Controls, Inc.
King of Prussia, Pa.

[54] RAPID RESET TIMING CIRCUIT EMPLOYING CURRENT SUPPLY DECOUPLING
15 Claims, 2 Drawing Figs.

[52] U.S. Cl. .......... 307/293, 307/251, 307/273
[51] Int. Cl. .......... H03k 17/28
[50] Field of Search .......... 307/293, 304, 205, 251, 279, 273

[56] References Cited
UNITED STATES PATENTS

| | | | |
|---|---|---|---|
| 3,461,325 | 8/1969 | Barrett | 307/251 X |
| 3,149,293 | 9/1964 | Farkas | 307/293 X |
| 3,210,613 | 10/1965 | Prapis | 307/293 X |
| 3,243,601 | 3/1966 | Higginbotham | 307/293 |
| 3,348,154 | 10/1967 | Fish et al. | 307/304 X |
| 3,414,739 | 12/1968 | Paidosh | 307/293 X |

*Primary Examiner*—John S. Heyman
*Attorneys*—Nelson E. Kimmelman and Maleson, Kimmelman and Ratner

ABSTRACT: The timing circuit is adapted to be connected to a DC power supply and has four branches. One branch is coupled to the supply and includes a capacitor which begins to charge up at the beginning of the timing interval when connected to the power supply. A second branch is in parallel with the first branch and includes a field effect transistor in circuit with a first resistor. The FET is coupled to the capacitor and is adapted to be turned on when it has a predetermined charge. The third branch is in parallel with said first branch and includes a second resistor and a potentiometer which is coupled to the switching means to control the voltage, and hence the time, at which the FET is rendered conductive. A fourth branch is in parallel with the first branch and includes a second transistor connected to the first transistor and adapted to be rendered conductive in response to conduction through said first transistor and to drive an appropriate output circuit such as a relay coil.

INVENTOR
GROVER K. HOUPT
BY
Maleson, Kimmelman & Ratner
ATTORNEYS

RAPID RESET TIMING CIRCUIT EMPLOYING CURRENT SUPPLY DECOUPLING

BACKGROUND OF THE INVENTION

A. Field of the Invention

This invention relates to all-electronic timing circuits.

B. Description of the Prior Art

In the prior art a number of all-electronic timing circuits were known, but they have been characterized by relatively high cost or low accuracy. Some timing circuits have used unijunction transistors whose firing point is governed by its intrinsic standoff ratio. These transistors were used with RC timing circuits and in order to vary the timing interval, the resistance of the RC circuit was changed. With these circuits it was necessary to use a relatively large value capacitor which made them relatively expensive. Also, larger capacitors are only available in certain types of construction which have less desirable qualities than other types of construction available in capacitors having smaller capacitive values, the latter types having better leakage and dielectric absorption characteristics which make for higher accuracy.

It is therefore desirable to have a timing circuit which can employ a very low value capacitor in the RC timing circuit. This, in turn, necessitates a very high value resistor. The use of this resistor gives rise to the need for a very sensitive threshold detector such as a field effect transistor that also offers low leakage and bias current.

SUMMARY OF THE INVENTION

The invention comprises a circuit adapted to be connected to a DC power supply. A first branch coupled to the power supply includes a capacitor, more specifically a relatively low value capacitor having good leakage and dielectric absorption characteristics, which is to be charged up to a predetermined charge to establish the timing interval. There is also a second branch in parallel with the first branch which includes a resistor in series with a first switching device that is coupled to the capacitor. There is also a third branch coupled to said second branch and comprising a resistor and a potentiometer in circuit with one another, the potentiometer being coupled to the first switching device and being variable to determine the voltage on said device which will render it conductive. A fourth branch is coupled to the third branch and includes a second switching device that is coupled to the first switching device and is rendered conductive in response to conduction through the first device. The second switching device may also be used to drive an appropriate load circuit which is to be timed.

DETAILED DESCRIPTION OF THE DRAWINGS

Figure 1:
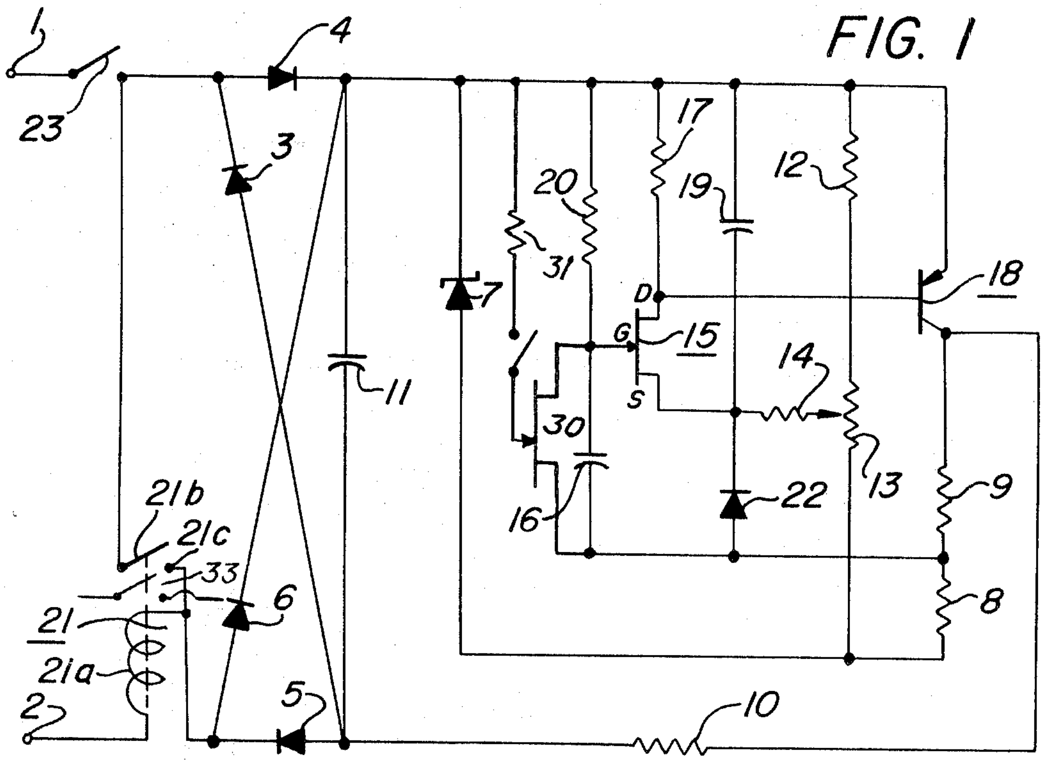
FIGS. 1 and 2 are both schematic drawings of two forms of the invention.

Referring now to FIG. 1 there are shown input terminals 1 and 2 adapted to be connected to a 110–120 VAC line, for example. There is a switch 23 in one side of the line which, when closed, initiates the "on delay" mode of operation of this timer. The "on delay" mode means that a certain period of time elapses after the closure of switch 23, depending upon the setting of the timer, until the contacts 21*b* and 21*c* and of the switch 33, which is connected to the controlled load circuit, are closed. The diodes 3, 4, 5, and 6 comprise a power supply bridge circuit for the overall apparatus which is very insensitive to high transient voltages. When the switch 23 is closed capacitor 11 quickly charges up to the line voltage and current will flow downward through the Zener diode 7, up through resistors 8 and 9 and thence through resistor 10 and the relay coil 21*a* which does not actuate the contacts 21*b*, 21*c* and switch 33. The voltage across the Zener diode 7 is regulated at a fixed voltage, say 22 volts and the rest of the input voltage is dissipated across the resistors 8 and 9, the resistor 9 being responsible for the main voltage drop because of its larger value.

While current flows downward through Zener diode 7 in one branch, it is also flowing downward through resistor 12 and potentiometer 13 whose wiper 24 is connected to and controlled by the time dial knob of the timer. The voltage across resistors 12 and 13 is also maintained at 22 volts by the action of the Zener diode.

At the same time, current is flowing downward into the branch comprising the timing resistor 20 and the timing capacitor 16. In so doing, it is charging up the timing capacitor 16 and the voltage on the gate G of the field effect transistor (FET) 15 is gradually increasing whereas the source S is at a constant voltage. As long as the G-S voltage is less than the so-called "pinch-off" voltage of the transistor, there will be no conduction through the FET and hence the timing capacitor 16 will charge exponentially. When the G–S voltage approaches a slightly negative voltage, that is, when the G becomes slightly more negative than S, FET current will flow downward through resistor 17, through the FET 15, through resistor 14 and the dial potentiometer 13 to the other side of the line via resistors 8, 9, and 10. This will cause a voltage drop across the resistor 17 which, when it reaches a predetermined voltage, say −0.5 volt, will cause the PNP transistor 18 to conduct and current will flow downward through it. At the junction of resistors 8 and 9 the voltage will go more positive with respect to the anode of the Zener diode 7 and therefore the lower plate of the capacitor 16 will also go more positive. As a result, the top plate of capacitor 16 also goes more positive so that the transistor 15 conducts even more heavily. Therefore the base of the transistor 18 will be driven even more negative causing it to increase its conduction in a regenerative fashion. Thus, the positive feedback at the junction of resistors 8 and 9 causes the circuit to have a "snap" on action in less than a millisecond even if there is a long time constant setting of the timer.

When the transistor 18 goes on current will flow from emitter to collector and thence through resistor 10 to the input terminal 2. Effectively, the conduction through the transistor 18 operates as a short circuit across the bridge comprising the four diodes 3, 4, 5 and 6. The only limitation on the current is the limiting resistor 10 so that almost full line voltage then appears across the relay coil 21*a* causing it to close the normally open contacts 21*b* and 21*c* and the load switch 33. At the same time, all voltage is removed from the timing circuits.

When the dial potentiometer 13 has its wiper 14 at the bottom resistance setting, the transistor 15 will fire when the voltage across timing capacitor 16 is very slightly positive, whereas when the wiper is in the topmost position as shown the transistor 15 will fire only with a much higher voltage across it. The original values of the resistor and the capacitor should be set so that the voltage across the capacitor 16 should be equal to 63 percent of the Zener voltage. By using the dial potentiometer and the fixed resistance value, much higher values for the timing resistor 20 are possible than is the case with the conventional variable resistors in the RC circuits of conventional timers. For example, the value of 20 might be, for a 300 second timing interval, 75 megohms so that the value of the capacitor 16 can be much lower. Fixed resistances in the 75 megohm range are easily obtainable, but are not easily obtainable in potentiometer form. Since the value of the timing capacitor 16 can be much lower, one is not limited to the highest capacitance value capacitors such as those of the aluminum or tantalytic electrolytic types. These types are characterized by relatively poor leakage and poor dielectric absorption characteristics. Instead, the capacitor 16 can be of the Mylar dielectric type which is considerably less expensive and has a better leakage and dielectric absorption characteristics. For even better performance, it would be possible to use a polycarbonate type of capacitor, but this makes the circuit more expensive.

The use of a field effect transistor instead of a unijunction transistor results in superior performance because there is a very low leakage current which is quite useful in the case of a timing circuit comprising a very low value of capacitance and a high value of resistance. In the latter case, it is also necessary to have a threshold sensing device which requires very low current and this is another important advantage of a field effect transistor.

Capacitor 19 may be an inexpensive electrolytic type of capacitor. Its purpose is as follows: Normally, even when the G–S voltage is zero, (when the switch 23 is open) the transistor 15 is conducting since it is a depletion mode FET. Thus, were it not for the presence of the capacitor 19, when the switch 23 is closed the relay coil 21*a* would be energized closing the contacts 21*b* and 121*c* and switch 33. The capacitor 19 keeps the voltage across the potentiometer 13 following the supply voltage so that the voltage at S goes down and the capacitor 19 shorts out the transistor 15 and resistor 17 during the small interval just after the switch 23 is closed so that the transistor 18 is prevented from turning on. When the supply voltage gets up to equilibrium and capacitor 19 is charged up the transistor 15 is held off because the voltage of S is higher than the voltage at G.

Another function of the capacitor 19 is to maintain the current into the transistor 18 during the regenerative period. Otherwise the regeneration tends to cut its own power off because the conduction through transistor 18 would discharge the capacitor 11 rapidly.

The purpose of the diode 22 is to prevent reverse charging of the timing capacitor 16 during the regeneration phase. If the capacitor were charged with the wrong polarity it would take a long time to leak off since there is no proper discharge path for a charge of that polarity and thus it would require a long reset time. The diode 22 aids in obtaining the exact discharge of the timing capacitor 16 since the voltage drop across it is exactly equal to the voltage drop across the FE$^T$ 15.

Resistor 8 is used as the zero setting calibrating resistor, its value being selected so that the voltage drop across it is equal to the pinch-off voltage of FET 15. The voltage drop is mostly effected by the current to the Zener diode 7. The resistor 12 is used as the range setting in calibrating the dial of the circuit of FIG. 1.

One set of values for the various components of the circuit shown in FIG. 1 which has proved very satisfactory is as follows:

| No. | Type or Value |
|---|---|
| 3, 4, 5, 6 | IN5060 |
| 7 | EVR 22A |
| 8 | 200 (typical) |
| 9 | 47K |
| 10 | 100 |
| 11 | 0.22 mf. |
| 12 | 10,000 (typical) |
| 13 | 30K |
| 14 | 820 |
| 15 | 2N4302 |
| 16 | (depends on time range) |
| 17 | 15K |
| 18 | 2N4888 |
| 19 | 10 mf. |
| 20 | (depends on time range) |

In order to provide an even faster discharge of the timing capacitor 16 after a timing cycle has been completed the additional circuit shown in broken lines in FIG. 1 may be added. It consists of a current-limiting resistor 31 in series with the gate of another FET 30 whose drain is connected to the gate of FET 15 and whose source is connected to the junction of resistors 8 and 9. The FET 30 is of the "P" channel depletion type. This FET therefore is nonconductive whenever there is a positive voltage applied to its gate. Whenever the switch 23 is opened the charge across capacitor 11 bleeds off and therefore the voltage on the gate of FET 30 also goes off thereby rendering the latter conductive. Consequently, the plate of the capacitor 16 attached to the gate of the FET 15 discharges through the D–S circuit of FET 30.

If it is desired to restart the circuit by reclosing switch 23, capacitor 11 charges up so that there will be a bias supplied to the gate of the FET 30 thereby turning it off to allow the timing capacitor 16 to charge up for the next timing cycle.

Figure 2:
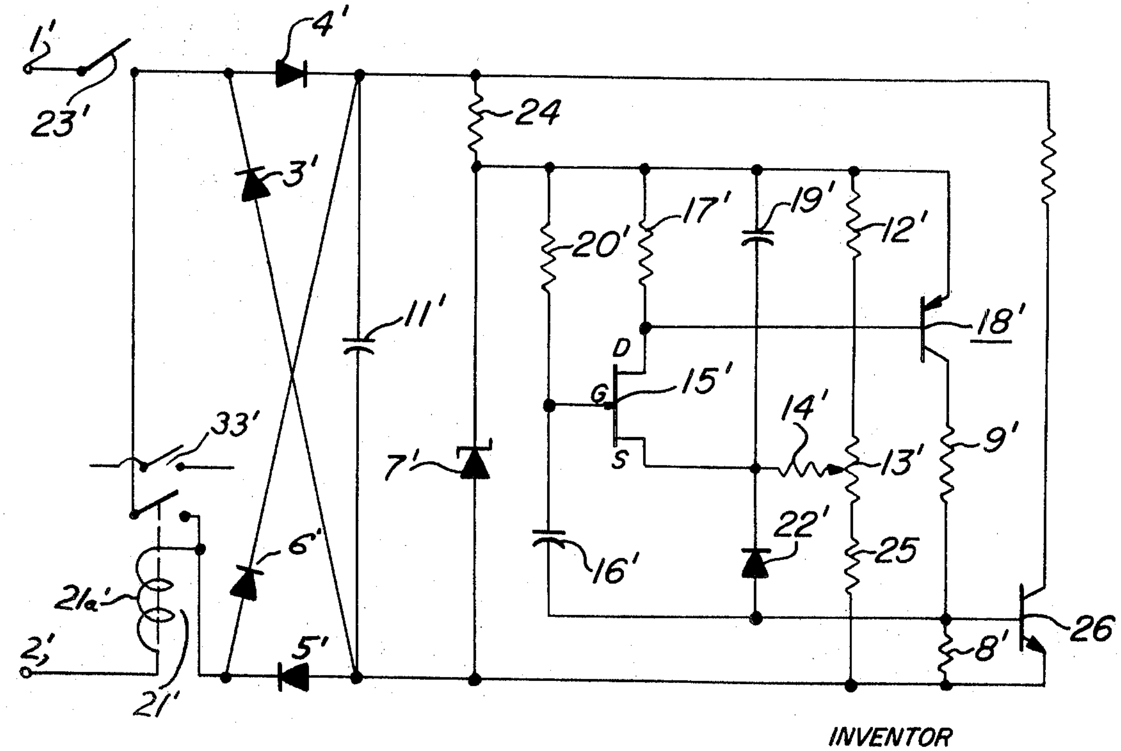

In another form of the invention as shown in FIG. 2, wherein primed numbers designate substantially the same components as their unprimed counterparts in FIG. 1, there is a resistor 25 in series with the potentiometer 13 which is used to produce the bias voltage that keeps the FET 15' off when the wiper 14 is at the bottom position. This supplants the action of resistor 8 in FIG. 1. One slight disadvantage of this is that there may be interaction between resistor 25 and resistor 12' when the dial potentiometer 13' is calibrated. The main advantage of this, though, is that the bias voltage is regulated by the Zener diode which results in greater accuracy of the timing action of the circuit.

Still another possible variation (not shown) is the use of a silicon controlled rectifier (SCR) in place of the transistor 18. However, because the gate electrode of the SCR would have to be actuated by a positive voltage it would be necessary to use a "P" channel FET instead of the "N" channel FED 18 shown in FIG. 1 and the polarity of the supply voltage would accordingly be reversed.

In FIG. 2 another form of the invention uses another transistor. When this additional transistor 18' is turned on a voltage will appear at the junction of resistors 8' and 9' which will cause the additional transistor 26 to turn on and thereby supply more current to the relay coil 21A'. In FIG. 2, the resistor 24 is only for voltage dropping purposes and is somewhat similar in its function to the function of resistor 8 in FIG. 1 (which also plays a part in the regeneration effect). The resistor 25 is used as the zero setting resistor in calibrating the dial whereas the resistor 12' is used as the range setting resistor for calibration.

I claim:

1. A rapid reset timing circuit for connection to a current supply, comprising:
   a. a first branch coupled to said supply which includes a timing capacitor,
   b. a second branch in parallel with said first branch which includes first voltage actuated, low leakage switching means in circuit with a first resistor, said switching means being coupled to said timing capacitor and adapted to be actuated in response to a predetermined charge thereupon,
   c. a third branch coupled to said second branch which includes a second resistor and a potentiometer which is coupled to said first switching means to enable control of the actuation of said switching means in response to the charge on said timing capacitor,
   d. a fourth branch coupled to said second branch which includes a second switching means, said second switching means being coupled to said first switching means for actuation in response to a predetermined current through the latter, said second switching means also being adapted to provide an output current for a load circuit, and
   e. means responsive to said output current for decoupling said current supply from at least said first branch whereby rapid resetting of the timing capacitor is effected.

2. The timing circuit according to claim 2 with the addition of a third resistor in circuit with said second switching means.

3. The timing circuit according to claim 2 with the addition of voltage regulating means coupled to said DC supply.

4. The timing circuit according to claim 2 with the addition of a fourth resistor in series with said timing capacitor.

5. The timing circuit according to claim 4 wherein said fourth resistor has a high ohmic value and said timing capacitor has a relatively low capacitance value.

6. The timing circuit according to claim 4 wherein said first switching means is a field effect transistor whose gate is connected to the junction of said fourth resistor and wherein said switching means is a second transistor whose base is connected to the drain of said field effect transistor.

7. The timing circuit according to claim 6 with the addition of a second capacitor in parallel with said second branch and which is connected to the source of said field effect transistor, said source also being connected to the wiper of said potentiometer.

8. The timing circuit according to claim 6 with the addition of a unidirectional current conducting device connected between the source of said field effect transistor and said third resistor.

9. The timing circuit according to claim 3 with the addition of a capacitor in parallel with said voltage regulating means.

10. The timing circuit according to claim 4 wherein a fifth resistor is coupled to said second switching device in series with said third resistor.

11. The timing circuit according to claim 4 wherein a sixth resistor is coupled to said second switching device in parallel with said third resistor.

12. The timing circuit according to claim 2 with the addition of a third switching device coupled to said third resistor and to said power supply.

13. The timing circuit according to claim 2 with the addition of means coupled to said supply, to said first switching device, and to said third resistor for accelerating the discharge of said timing capacitor at the completion of a timing cycle.

14. The timing circuit according to claim 13 wherein said additional means comprises a field effect transistor whose drain-source circuit is in parallel with said timing capacitor, and whose gate is in series with a seventh resistor which is connected to said supply.

15. The timing circuit according to claim 4 with the addition of another resistor in said third branch in series with said second resistor and said potentiometer.

* * * * *

UNITED STATES PATENT OFFICE
CERTIFICATE OF CORRECTION

Patent No. 3,621,304 Dated November 16, 1971

Inventor(s) Grover K. Houpt

It is certified that error appears in the above-identified patent and that said Letters Patent are hereby corrected as shown below:

On the cover sheet, the figure shown should appear as shown below:

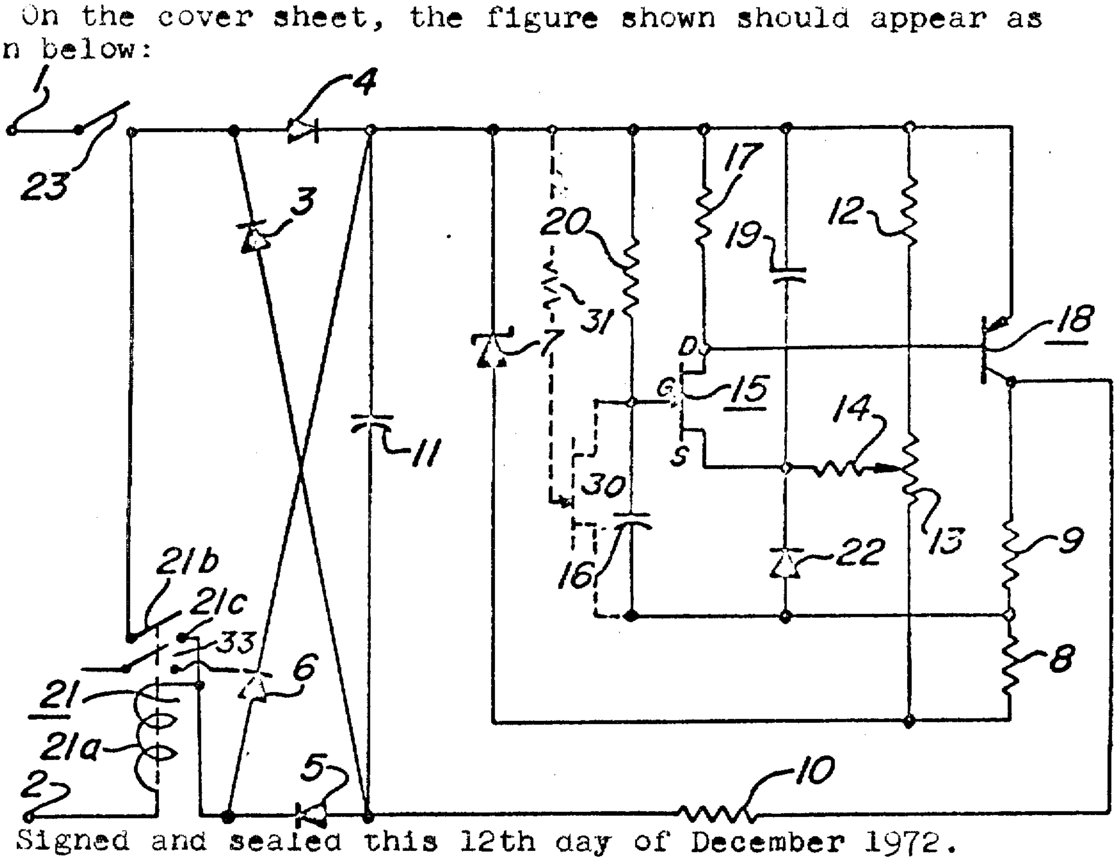

Signed and sealed this 12th day of December 1972.

(SEAL)
Attest:

EDWARD M.FLETCHER,JR.
Attesting Officer

ROBERT GOTTSCHALK
Commissioner of Patents